United States Patent Office 3,274,206
Patented Sept. 20, 1966

3,274,206
PROCESS FOR THE PRODUCTION OF PYRIDINE ALDEHYDES
Godfrey Wilbert, Carmel, Louis Scarano, Middletown, and Bernard F. Duesel, Yonkers, N.Y., assignors to Nepera Chemical Co., Inc.
No Drawing. Filed Mar. 6, 1964, Ser. No. 350,099
9 Claims. (Cl. 260—297)

This invention relates to a method of making pyridine aldehydes and more particularly, to a simple but yet efficient method for the preparation of pyridine aldehydes by the catalytic hydrogenation of pyridine nitriles with controlled quantities of hydrogen.

Pyridine aldehydes are valuable chemical compounds which have increased in importance because of the great utility these compounds possess both alone and as intermediates for the synthesis of other compounds. For example, quaternary oximes prepared from the corresponding pyridine aldehydes are recognized effective antidotes for use in the treatment of mammals poisoned by compounds of high anticholinesterase while 4-pyridine aldehyde is a useful intermediate in the synthesis of various herbicides such as the corresponding o-propyloxime derivative. As a result of the increased importance of pyridine aldehydes, an economical and efficient method for their production is deemed highly desirable.

One of the first methods for the preparation of pyridine aldehydes consisted in condensing the iodomethylate of α-picoline with p-nitrosodimethylaniline, hydrolyzing the condensation product and thereafter decomposing the hydrolyzed product into aldehyde and methyl iodide. In 1918, Harries (Annalen 410, 95 (1915)), and Lenart (Berichte, 47: 808–810 (1941)) prepared pyridine aldehyde by ozonization of stilbazole and benzoylmetanicotine while Pannizon (Helv. Chim. Acta, 24, 24E (1941)) isolated 3-pyridine aldehyde from the benzenesulfonyl derivative of nicotinic acid hydrazide. The 4-isomer, however, was not described until 1945 when Wilbaut (Rec. Trav. Chim., 64, p. 30) obtained this isomer by the ozonolysis of 4-styrylpyridine. More recently, however, a number of methods for the preparation of pyridine aldehydes have been published such as that of Mathes et al., U.S. Pat. No. 2,749,351, which involves oxidation of methyl pyridines over a catalyst at 410° C. This procedure, however, requires an elaborate vapor phase installation involving considerable capital expenditure.

The Callighan et al. patent, U.S. Pat. No. 3,067,205, describes a procedure for preparing pyridine aldehydes by the ozonolysis of vinylpyridines at a temperature from about −100° C. to about 0° C. This process also requires involved equipment to operate at such low temperatures which greatly limits the commercial application of the process.

Procedures based upon the selective oxidation of alkylpyridine derivatives with oxidation agents such as selenium dioxide have also been proposed. A typical example of this procedure is described in Pharm. Bull. Japan, 3, 232–3 (50 C.A. 10,092) wherein it is disclosed that one part by weight of selenium dioxide is required to oxidize two parts by weight of pyridine carbinol. However, the use of a large ratio of selenium dioxide to pyridine carbinol makes this process commercially unfeasible.

A method for the preparation of 3-pyridine aldehyde has been proposed by Mignonac and Boubon in U.S. Pat. No. 2,945,862, which involves reduction of 3-pyridine nitrile in sulfuric acid by a nickel catalyst. This process, however, requires the use of large quantities of nickel catalyst and since nickel dissolves in sulfuric acid, a purification problem is also present which considerably adds to the cost of producing the aldehyde. Moreover, in the case of the 2- and 4-pyridine aldehydes, this method gives only trace amounts of the desired products.

A number of new procedures for the preparation of pyridine aldehydes have been described which start with pyridine-N-oxide derivatives. For example, Raschig, U.S. Pat. No. 3,008,963, obtains aldehydes by heating the corresponding carbinols of the N-oxides. However, the N-oxides of pyridine derivatives are hazardous to prepare and are difficult to employ in an effective process as heating of pyridine N-oxides of the carbinol can readily lead to detonations.

Pyridine nitriles offer a satisfactory starting material for the preparation of pyridine aldehydes provided these nitriles can be converted in reasonable yields without expensive reagents. Several laboratory scale procedures have been described which reduce the nitriles with expensive exotic reducing agents such as sodium triethoxyaluminum hydride (Hesse and Schrodel, Angew. Chem., 68, 438 (1956)), lithium aluminum hydride (Friedman, Abstr. ACS—116th Meeting, pp. 5M–6M (1949)), and sodium hypophosphite in pyridine or acetic acid (Backlberg and Staskun, J. Chem. Soc., 3961 (1962)). None of these procedures, however, offer a satisfactory process for the commercial production of pyridine aldehydes.

Finally, it is recognized that processes for the hydrogenation of cyano pyridines are known to the art. For example, Chase in U.S. Pat. No. 2,615,896 discloses a process for the hydrogenation of 3-cyano pyridine in an acidic aqueous solution by the action of a hydrogenation catalyst. None of these processes, however, are directed to the preparation of pyridine aldehydes but are, as in the Chase process, directed to the preparation of compounds such as 3-pyridyl-carbinol.

It has now been found that it is not necessary to use expensive reducing agents such as sodium triethoxyaluminum hydride to reduce pyridine nitriles but that low cost hydrogen may be employed for the preparation of pyridine aldehydes by the method of the present invention. The present method is not only simple and practical for commercial operation but also offers greater control over reaction conditions as to time, temperature and ratio of reactants while employing only a reasonable quantity of catalyst which may be reused in the process.

An object of the present invention, therefore, is to provide a commercial process for the preparation of pyridine aldehydes by controllably reacting pyridine nitrile with molecular hydrogen in the presence of a certain hydrogenation catalyst.

Another object of this invention provides a commercially feasible process for the preparation of the 2- and 4-pyridine aldehydes.

A further object of this invention provides a process for the preparation of substituted pyridine aldehydes in the presence of certain hydrogenation catalysts at prescribed temperatures and with controlled reaction concentrations of molecular hydrogen.

Further objects will become apparent from the following detailed description.

According to the present procedure, it has been found that it is possible to arrest the hydrogenation of pyridine nitriles at the aldimine stage. The pyridine aldimine which is so formed may then be hydrolyzed to the desired pyridine aldehyde without the formation of large quantities of Schiff's base or a secondary amine. It has also been found that the procedure of the present invention works equally well on the 2- and 4- isomers which gives the corresponding pyridine aldehydes in excellent yields and reasonable quality.

The reaction may be represented thus:

REACTION SCHEME

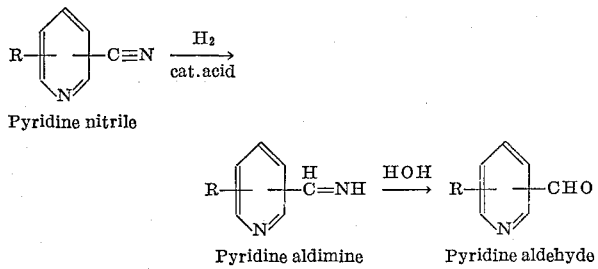

Pyridine nitrile

Pyridine aldimine        Pyridine aldehyde

The designation R in the above reaction scheme represents various substituted groups as lower alkyl having 1–6 carbon atoms in straight or substituted chains, as well as any substituted pyridine nitrile containing a substituent compatible with the reaction which will give the corresponding pyridine aldehyde. Substituted nitriles such as nitriles from the picolines, lutidines or collidines series will give alkylsubstituted aldehydes by the present process. Further, the present procedure is also applicable to other nitriles, substituted or otherwise, of the aromatic or heterocyclic series. For example, it is applicable to nitriles of the diazine, pyrazine, pyridazine, quinoline, isoquinoline and other such nitriles.

Pyridine aldehyde is obtained by the above-described reaction in reasonable yields and of a purity such that it may be converted without further purification directed into other derivatives such as the corresponding oxime. Preferably, the aldehyde is converted to the oxime by the addition of an acid salt of hydroxylamine such as the sulfate, hydrochloride, or the like.

In carrying out the present invention, a substituted pyridine nitrile is dissolved in a suitable carrier such as hydrochloric acid, phosphoric acid, or the like which solution is thereafter placed in a convenient reaction vessel designed to receive molecular hydrogen. In the case of some acids, it has been found desirable to add water in an amount up to about 5 times by weight of the acid to form aqueous acid solutions. In all instances, however, the reaction medium is preferably maintained in the acid pH range of pH <1 to about pH 5.

A hydrogenation catalyst such as palladium, platinum dioxide or the like taken either in combination or separate, alone or on a suitable carrier such as carbon, alumina, charcoal, or the like is next added to the reaction vessel in an amount from about 0.01 to about 0.5 part by weight of the hydrogenation catalyst taken alone per part by weight of pyridine nitrile feed. In the continuous preparation of pyridine aldehydes, the catalyst may be recycled without departing from the present practice.

During the course of the initial reaction, hydrogen is preferably added in about an equal molar amount based on the nitrile feed, at a pressure desirably less than 50 p.s.i.g., non-critically, and at incipent reaction temperatures in the range of 10° C. to about 70° C. Preferably, the reaction temperature is maintained in the range of about 25° C. to about 35° C. during the course of the entire reaction. Thereafter, the reaction medium is desirably filtered to recover the catalyst and the filtrate is neutralized with a suitable basic material such as sodium hydroxide, sodium carbonate, sodium acetate, ammonia and the like. The pyridine aldehydes so produced may then be isolated by known means such as by extraction or by steam distillation.

Although a number of variations may be employed in the present process through the use of various hydrogenation catalysts, combination of these catalysts, various acids, and aqueous acids of varying concentrations along with a variety of reaction conditions, the 2- and 4-pyridine aldehydes are preferably prepared by the procedure of the examples.

The following examples are included to further illustrate the practice of the present invention.

*Example 1*

A solution of 20.8 grams (0.2 mole) of 2-pyridine nitrile in 35 milliliters of 37% by weight hydrochloric acid and 65 milliliters of water is hydrogenated over 1.0 gram of 5% by weight palladium on a carbon carrier at a pressure of 30–50 p.s.i.g. and a temperature of 25–35° C. After 0.2 mole of hydrogen has been reacted under these conditions, both reactants and catalyst are allowed to stand at room temperature, i.e., about 20° C. The reaction media is thereafter filtered to recover the catalyst which may be preserved for re-use if desired. The straw colored filtrate so recovered is then neutralized with 28% by weight solution of ammonium hydroxide and the aldehyde is isolated by steam distillation. A high yield of aldehyde is formed in the reaction and can be determined exactly by solvent extraction of an aliquot and assay by chromatography method. An indicated yield of 70% is found to result. The isolated 2-pyridine aldehyde is found to distill at 181° C. at 760 mm. pressure.

*Example 2*

A solution of 20.8 grams (0.2 mole) of 2-pyridine nitrile is reacted according to Example 1 and the filtrate obtained after catalyst removal is treated with 14.0 grams of hydroxylamine hydrochloride. A saturated solution of sodium carbonate is added to pH 5.5 after which the solution is heated on the steam bath at 65–70° C. for ten minutes. On cooling, fine white needles of 2-pyridine aldoxime separates out and after cooling to 10° C. for several hours, the crystals are recovered by filtration. After washing sparingly with ice water, the product crystals are practically colorless and are found to melt at 109–111° C. The yield is 68% of theory results without further re-processing the filtrate. The product is purified by recrystallization from water and is found to melt at 112–113° C.

*Example 3*

The procedure of Example 1 is repeated except that 3-pyridine nitrile is employed as the starting material. The yield of 3-pyridine aldehyde formed in the reaction is found to be about the same as the yield in Example 1.

*Example 4*

The 3-pyridine aldehyde of Example 3 is converted as in Example 2 directly to the oxime which is obtained as white crystals melting at 150°–151° in yields as high as 80% of theory.

*Example 5*

Example 1 is repeated using 4-pyridine nitrile as the starting material. The yiled is slightly lower than in Example 1. The isolated product is distilled at 77–78° at 12 mm./Hg and forms a phenylhydrazone having a melting point of 179° C.

*Example 6*

The reaction filtarte obtained from a run carried out according to the procedure of Example 5 is treated with 14.0 grams of hydroxylamine hydrochloride. The solution is neutralized with saturated sodium carbonate to pH 5.5. On warming for 10 minutes on the steam bath white needles separated from the solution. These crystals are found to melt at 130–132° C. and upon recrystallization out of water have a melting point of 131–132° C. The yield is about 61% theory.

It is to be understood that the foregoing detailed description is given merely by way of illustration and that many variations may be made therein without departing from the spirit of this invention.

What is claimed is:

1. A method for the preparation of pyridine aldehydes which comprises, subjecting the corresponding nitrile maintained in an aqueous acid reaction medium containing a hydrogenation catalyst selected from the group consisting of palladium and platinum dioxide, to controlled hydrogenation by the action of an approximately equal molar amount of molecular hydrogen based on the quantity of said nitrile, wherein the reaction temperature is less than about 70° C.

2. The method of claim 1 wherein the hydrogenation catalyst is palladium.

3. The method of claim 1 wherein the hydrogenation catalyst is platinum dioxide.

4. A method for the preparation of substituted pyridine aldehydes which comprises, subjecting the corresponding nitrile to controlled hydrogenation by the action of an approximately equal molar ratio of molecular hydrogen based on said nitrile in an aqueous acid medium maintained at a reaction pressure less than about 50 p.s.i.g., a reaction temperature in the range of about 10° C. to about 70° C. and in the presence of a hydrogenation catalyst selected from the group consisting of palladium and platinum dioxide.

5. A method for the preparation of 2-pyridine aldehyde which comprises, subjecting the corresponding nitrile to controlled hydrogenation by the action of an approximately equal molar ratio of molecular hydrogen based on said nitrile in an aqueous acid medium maintained at a reaction pressure less than about 50 p.s.i.g., a reaction temperature in the range of about 25° C. to about 35° C. and in the presence of a hydrogenation catalyst selected from the group consisting of palladium and platinum dioxide.

6. A method for the preparation of 3-pyridine aldehyde which comprises, subjecting the corresponding nitrile to controlled hydrogenation by the action of an approximately equal molar ratio of molecular hydrogen based on said nitrile in an aqueous acid medium maintained at a reaction pressure less than about 50 p.s.i.g., a reaction temperature in the range of about 25° C. to about 35° C. and in the presence of a hydrogenation catalyst selected from the group consisting of palladium and platinum dioxide.

7. A method for the preparation of 4-pyridine aldehyde which comprises, subjecting the corresponding nitrile to controlled hydrogenation by the action of an approximately equal molar ratio of molecular hydrogen based on said nitrile in an aqueous acid medium maintained at a reaction pressure less than about 50 p.s.i.g., a reaction temperature in the range of about 25° C. to about 35° C. and in the presence of a hydrogenation catalyst selected from the group consisting of palladium and platinum dioxide.

8. A method for the preparation of pyridine aldoximes which comprises,
   (a) forming pyridine aldehyde by subjecting the corresponding nitrile maintained in an aqueous acid reaction medium to controlled hydrogenation by the action of an approximately equal molar ratio of molecular hydrogen based on said nitrile maintained at a reaction pressure less than about 50 p.s.i.g. and a reaction temperature less than about 70° C. while in the presence of a hydrogenation catalyst selected from the group consisting of palladium and platinum dioxide;
   (b) reacting the pyridine aldehyde so formed with an acid salt of hydroxylamine; and
   (c) recovering pyridine aldoxime from the reaction mixture.

9. A method for the preparation of pyridine aldehydes which comprises, subjecting the corresponding nitrile maintained in an aqueous acid reaction medium to controlled hydrogenation by the action of an approximately equal molar amount of molecular hydrogen based on said nitrile, and maintained at a reaction pressure less than about 50 p.s.i.g. and a reaction temperature in the range of about 25° C. to about 35° C., while in the presence of a hydrogenation catalyst selected from the group consisting of palladium and platinum dioxide, said hydrogenation catalyst being supported on a carrier selected from the group consisting of carbon, alumina, and charcoal.

References Cited by the Examiner

German Auslegeschrift 1,088,958, September 1960.
Bernthsen et al., "Organic Chemistry," 1941 Ed., pp. 741–756 (Blackie).

WALTER A. MODANCE, *Primary Examiner.*
ROBERT T. BOND, *Assistant Examiner.*